Oct. 23, 1962
H. C. ROTHERY
3,059,775
APPARATUS FOR SEPARATING MATERIALS
Filed Oct. 1, 1959
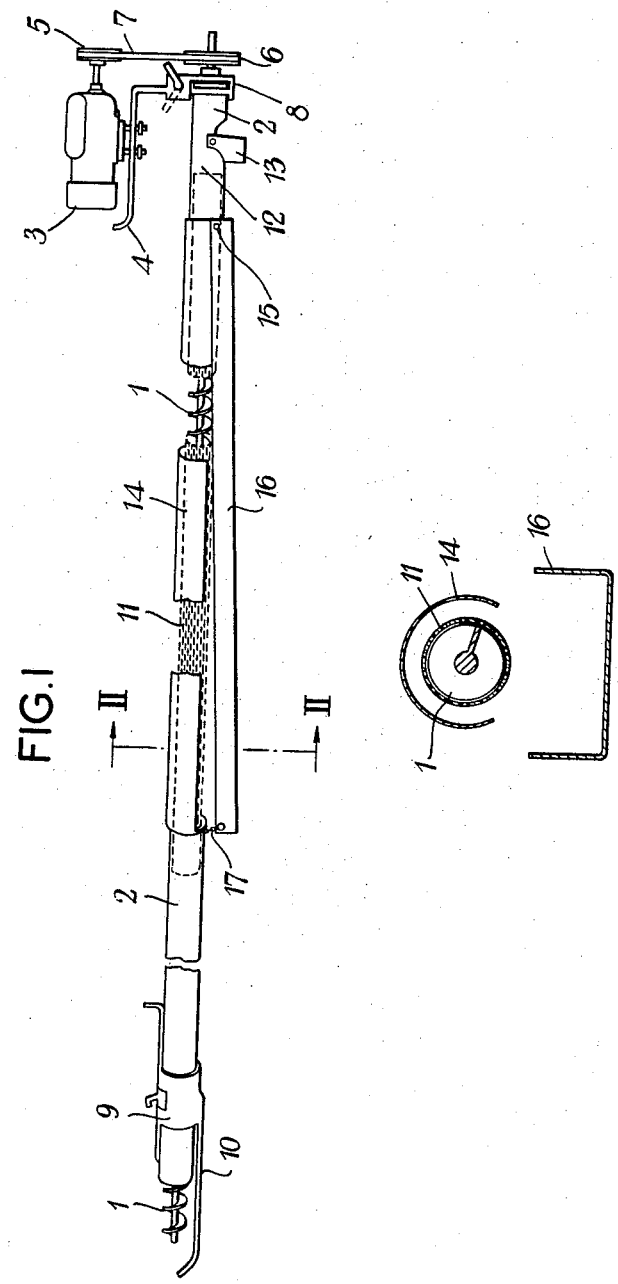
INVENTOR:—
Henry Charles Rothery
By Alexander ...

United States Patent Office 3,059,775
Patented Oct. 23, 1962

3,059,775
APPARATUS FOR SEPARATING MATERIALS
Henry C. Rothery, Thorpe Tilney Hall, Walcot,
Lincoln, England
Filed Oct. 1, 1959, Ser. No. 843,850
Claims priority, application Great Britain Oct. 8, 1958
1 Claim. (Cl. 209—284)

The present invention relates to an apparatus for and method of separating materials and more particularly although not exclusively solid materials.

An object of the present invention is to provide, inter alia, apparatus for separating solid materials, for example for cleaning grain, or for grading gravel, sand, anthracite, coal, slag, coffee beans, or any other divided material. A subsidiary object is to provide apparatus which at the same time will convey material as it is being sorted from one point to another.

Broadly the present invention contemplates a method of separating materials which comprises passing them over a perforated surface to separate them from material which is smaller than the perforations and simultaneously applying to the materials a movement in the direction of the perforated surface. Heretofore materials have been passed over shaker screens where the force of gravity alone has been relied upon to effect the separation of the small materials which drop by gravity through the perforations.

In a preferred embodiment of the present invention the materials are passed through a cylindrical perforated surface and at the same time have applied thereto a centrifugal force whilst pursuing a helical path.

In a preferred form of the invention the apparatus according to the present invention comprises an auger encased by a perforated or apertured tubing, the speed of rotation of the auger in relation to the material being separated being such that rotation of the auger serves to impart to the materials a centrifugal force which throws the materials against the perforated tubing. At the same time by virtue of the auger the material is conveyed along the tubing to be delivered separated from the small material at the delivery end of the auger.

It has been found that a particularly good effect is obtained by using an auger which has a degree of float in its casing, which effect can be achieved by mounting the auger in the tubing without axial support at one end, the material being cleaned serving to maintain and centralise the auger.

Conveniently the perforated surface has imparted to it a shaking action and in one embodiment in which an auger as described above is employed, the casing to the auger is suspended only at its ends so that the rotation of the auger and the movement of the material along the auger together with the effect of the drive at one end or the other of the auger serves to shake the tubing up and down which assists in keeping the perforations clear.

In a preferred embodiment in which an auger is employed the lower end at least of the tubing is imperforate and surrounding the perforated portion of the tubing is a casing into which the material passing through the perforations is thrown and collected. If the auger is inclined at an angle so that the grain or other material being cleaned moves upwardly as it is being cleaned the material separated therefrom and falling into the casing drops down the casing to be delivered at the lower end and there if desired can be collected. Conveniently the casing can comprise an upper fixed shield secured to the tubular housing of the auger and a lower channel member which is suspended from the casing at one or both ends by a flexible connector, for example a chain, so that an additional shaking effect is imparted to the channel section which helps the material collected therein to be delivered to the lower end.

The invention will now be described with reference to the accompanying drawings, in which:

FIGURE 1 shows in side elevation, part broken away, a separator suitable for grain cleaning; and FIGURE 2 shows a section on the line II—II of FIGURE 1.

In the example shown in the drawing, which is suitable for such purposes as grain cleaning, a screw auger construction is employed in which a conveying screw 1 rotates inside a tubular housing 2. The screw 1 is driven by means of a motor 3 carried on brackets 4 supported by the upper end of the auger tubing 2 and the motor 3 drives through pulleys 5 and 6 and belt 7 the screw 1. The screw 1 is mounted in a bearing (not shown) incorporated in the head plate 8 of the tubular casing 2. The lower end of the screw 1 is not mounted or supported in any way in an axial bearing but is free to float inside the tube 2. The motor speed and drive ratios from the pulley 5 to the pulley 6 is such that the screw rotates at a speed of the order of 1000 revolutions per minute.

In the example shown, which is suitable as stated above for cleaning grain, the tubular casing is of the order of 3 to 4 inches in diameter and is of total length of the order of 16 feet long. The lower end of the cleaner has the screw projecting from it for a number of convolutions and the amount of screw projecting can be adjusted by the shoe 9. Beneath the tubular casing 2 there extends a skid member 10 which serves as a ground support for the cleaner. The shoe 9 is axially adjustable along the tube so that the amount of screw projecting and thus the rate of feed of material into the tube can be varied. The lower portion of the tube 2, for example the lower 5 or 6 feet, is imperforate. The intermediate section of the tube is in the form of a perforated casing 11 and conveniently may be constructed from perforated metal. For the purpose of cleaning grain the mesh may have an aperture size of from about $\frac{1}{32}$ of an inch for the smaller seed crops up to the order of half an inch for the larger leguminous crops. The upper section 12 of the tube is imperforate and incorporates a delivery outlet 13 from which the cleaned grain or other material is delivered. Surrounding the perforated portion of the tubing 2 is a casing which comprises an upper fixed semi-circular shield 14 which is secured to the tube 2 by any convenient means, for example by brackets secured to the tube. Pivotally connected either to the tube 2 or to the upper shield 14 at 15 is a trough member 16 the lower end of which is connected either to the tube 2 or to the upper shield 14 by a flexible connecting member 17 which may be either a spring or a chain. This lower connecting trough 16 conveniently is somewhat wider than the upper shield 14 so as to ensure that material falling from the upper shield 14 is in fact collected in the trough 16.

In use the cleaner, when cleaning grain, is suspended so that its lower end dips into the grain to be cleaned and its upper end is supported at a higher level on any convenient bracket or the like with a sack or other receptacle positioned below the outlet 13 for receiving the cleaned grain.

Upon the motor 3 being operated the vibration set up in the cleaner is such that it is subjected to a limited shaking between its ends. The grain, which is collected by the screw 1, is delivered up the tube and when it reaches the perforated portion 11 is thrown against the perforated wall under centrifugal force produced by the relatively high rotation speed of the screw 1 and material which is smaller than the aperture size of the perforations is thrown outwardly into the upper shield 14 and drops into the trough 16 or is thrown downwardly directly into the trough 16.

Due to the speed of rotation of the screw 1 the grain passes over a cleaning path approximately equal to the linear distance corresponding to the length of the outer periphery of the helix of the screw. This of course is many times the length of the actual perforated tubing and thus is a great advance over some known forms of separating apparatus in which in one case the material is passed down a slowly rotating perforated drum and in the second case is passed through a perforated drum by means of a helical form of drive but at such a speed that the grain being cleaned passes over a perforated length corresponding only to the length of the perforated drum. In addition to this greatly increased length of perforated surface over which the grain is passed the grain is also tumbled and subjected to centrifugal force so that the small material is literally thrown through the apertures under centrifugal force.

By virtue of the shaking effect produced by the cleaner being suspended only at each end and being of such a construction to permit a certain flexing of the casing the apertures in the perforated tubing are then kept clean. Furthermore by the magnified shaking of the trough 16 by virtue of its flexible mounting the material separated out of the perforated tubing and collecting in the trough 16, even when the material is damp and soggy, is shaken down the trough 16 to collect in a pile upon the floor or to be collected in any convenient receptacle.

If desired hot air may be passed through the auger at the same time either by being introduced into the upper shield 14 or by being introduced into the tubular casing 2 at some point towards the lower end and being blown upwardly through the casing. This serves to dry the material being separated at the same time as cleaning it.

Whilst the invention has been described with particular reference to the use of the screw conveyor principle for cleaning grain or other material, it will be realised that other apparatus may be employed and for example a stationary screw can be positioned inside a perforated casing which is adapted to be rotated about the screw. Alternatively, both the screw and casing may be rotated either in the same or counter directions.

For most purposes it is convenient to have only a section of the tube perforated so that the material separated can be collected at a point separated from the bulk material being cleaned. However, the same advantages are obtained if the whole tube is perforated or it may be convenient to have sections of perforated tube in between which are imperforate sections. In this case each section of perforated tube may be of different mesh or aperture size so that materials of different size are separated out or graded along each perforated section, the largest materials being delivered from the upper end of the cleaner.

An advantage of the present invention is that the apparatus is economic to produce and is highly portable, the apparatus which can easily be carried over the shoulder being capable of dressing up to four tons of grain per hour. In that the screw is mounted only at one end in bearings the perforated section or the whole tube may easily be replaced so that with the one auger and driving motor an apparatus is provided which can clean or dress materials of widely differing size.

Unlike existing separating apparatus, particularly apparatus which is commonly used for dressing grain, the apparatus of the present invention serves also to convey the grain or other material from one position to another and for example allows grain to be dressed as it is being moved in bulk from a vehicle to its ultimate storage destination.

In this specification and claims the word perforation is used to cover any form of aperture or opening and includes wire mesh, expanded metal, or sheet metal which has been punched to provide the perforations. Alternatively, the perforated section may consist of parallel members axially arranged or by a series of spaced circular members or by a combination of such members. Again the perforated section may consist of a member coiled helically or in such other fashion to give a varying internal diameter.

What I claim is:

Apparatus for separating material of different sizes comprising a stationary perforated tubing, an auger rotatably positioned in and extending lengthwise of the tubing, means at one end of the tubing for introducing the material into the tubing to be engaged by the auger for conveying the material along the tubing, means at the other end of the tubing for discharging the material therefrom, drive means positioned at the other end of the tubing for rotating the auger at a speed sufficient to impel the material under centrifugal force against the perforated tubing while at the same time the material is conveyed by the auger in a substantially helical path through the tubing, a bearing at said other end of the tubing for rotatably supporting the corresponding end of the auger, the remainder of the auger being unsupported so as to float in the tubing whereby rotation of the auger by the said drive means imparts a vibratory motion to the tubing; casing means spaced from and surrounding the tubing for receiving the material discharged through the perforations; said casing means comprising a fixed shield surrounding at least the upper half of the periphery of the tubing, a trough member extending below the perforated tubing, means pivotally connecting one end of the trough to the tubing, and a flexible member connecting the other end of the trough to the tubing whereby the vibrations of the tubing are transmitted in amplified form to the trough.

References Cited in the file of this patent

UNITED STATES PATENTS

| 732,248 | Wilhelm | June 30, 1903 |
| 1,674,142 | Strang | June 19, 1928 |
| 2,523,259 | Aber | Sept. 26, 1950 |
| 2,549,999 | Andrews | Apr. 24, 1951 |
| 2,731,969 | Hoeksema | Jan. 24, 1956 |
| 2,829,763 | McCallum | Apr. 8, 1958 |

FOREIGN PATENTS

| 820,764 | Great Britain | Sept. 23, 1959 |